United States Patent
Lokowandt

(10) Patent No.: US 7,373,212 B2
(45) Date of Patent: May 13, 2008

(54) ALLOCATING PRODUCTS USING CLASSIFICATIONS OF ORDERS FOR THE PRODUCTS

(75) Inventor: Bernhard Lokowandt, Heidelberg (DE)

(73) Assignee: SAP AG, Walldorf (DE)

( * ) Notice: Subject to any disclaimer, the term of this patent is extended or adjusted under 35 U.S.C. 154(b) by 155 days.

(21) Appl. No.: 11/312,670

(22) Filed: Dec. 19, 2005

(65) Prior Publication Data

US 2006/0173567 A1    Aug. 3, 2006

(30) Foreign Application Priority Data

Dec. 17, 2004    (EP) .................... 04106695

(51) Int. Cl.
  *G06F 19/00* (2006.01)
(52) U.S. Cl. .............. 700/101; 700/99; 705/8
(58) Field of Classification Search ......... 700/99, 700/101; 705/8, 7
See application file for complete search history.

(56) References Cited

U.S. PATENT DOCUMENTS

| 7,058,587 | B1 * | 6/2006 | Horne | 705/8 |
| 2002/0019780 | A1 | 2/2002 | Herman | |
| 2003/0208392 | A1 | 11/2003 | Shekar et al. | |
| 2003/0216952 | A1 | 11/2003 | Klett et al. | |
| 2007/0050069 | A1 * | 3/2007 | Treichler et al. | 700/99 |

FOREIGN PATENT DOCUMENTS

| EP | 0520923 A2 | 12/1992 |
| WO | WO 2006/032301 * | 3/2006 |

OTHER PUBLICATIONS

Declaration Rule 45 for EP04106695.2 issued Jun. 22, 2005.
International Search Report for PCT/EP2004/05226 issued Apr. 1, 2005.
International Preliminary Report for PCT/EP2004/05226 issued Mar. 27, 2007.
Examination Report and Annex for EP04787182.7 issued Aug. 31, 2007.
Examination Report and Annex for EP04106695.2 issued Jan. 23, 2007.

* cited by examiner

*Primary Examiner*—Leo Picard
*Assistant Examiner*—Steven R. Garland
(74) *Attorney, Agent, or Firm*—Kenyon & Kenyon LLP

(57) ABSTRACT

A method and device for planning a production includes determining material flows of products that are part of the production. This determination is done by allocating available quantities of a product for covering demanded quantities of the product in time. An allocating procedure classifies orders for the demanded quantities according a priority and orders for the available quantities according to a feasibility to provide the quantity. The classifications of the orders are used to cover the demanded quantities with a higher priority by available quantities with a higher feasibility.

14 Claims, 10 Drawing Sheets

ALLOCATING PRODUCTS USING CLASSIFICATIONS OF ORDERS FOR THE PRODUCTS

FIELD OF THE INVENTION

The present invention generally relates to the field of using a computer system for production planning; and, more particularly, to determine material flows of products.

BACKGROUND TECHNOLOGY

Production planning is used to plan scenarios within a defined area of a production of products. One aspect of production planning is the determination of material flows of products which are part of the defined area of the production.

Usually, for such a product there is a demand and the demand specifies a demanded quantity and a demand date when the demand is due. There is also an availability of the product, and the availability specifies an available quantity and an availability date when the available quantity is scheduled to be available.

In case the demanded quantities exceed the available quantities, it may be possible to create further availabilities of the product and schedule the availabilities with the result that they acquire an available quantity and an availability date. The creation of availabilities of the product may include the scheduling of further processes which are required to provide the available quantities. It further may be possible that the availabilities have to comply with specific conditions which affect the available quantity or the availability date.

Frequently, the number of demands and availabilities for the product is large. Furthermore, in a dynamic production environment, the demands and availabilities change permanently. In such cases, one may use a computer system for processing demands and availabilities for the product. This also may be true for allocating the available quantities for the demanded quantities. The allocating procedure determines how the demanded quantities are covered by the available quantities. Generally, it is possible that one demanded quantity is covered by one or more available quantities and it is as well possible that one available quantity covers one or more demanded quantities.

The results of the allocating procedure determine the material flow of the product within the system of production planning. The allocating procedure may be required in the system of production planning to compute uncovered demanded quantities. The system of production planning may then adjust a production plan so that a previously uncovered demanded quantity is covered in a new allocating procedure.

Allocating the available quantities for the demanded quantities may be done by using only a time criteria. This can lead to a result where demands with an earlier date are covered by availabilities with an earlier date compared to other demands with the date farer in the future. Additional information which is available for the demands or for the availabilities is ignored in this allocating procedure. This may require modifying the result when the additional information is relevant for a final result. It may also require accepting the result which is disadvantageous taking into account the additional information.

Allocating the available quantities for the demanded quantities may further include assigning a priority to the demands and taking the priority and the time into account. This may lead to results where many demands with a higher priority are covered by availabilities which are in time and many demands with a lower priority are covered by availabilities which are not in time. Additional information which is available for the availabilities is ignored in this allocating procedure. Again, this may require modifying the results when the ignored information is relevant or accepting the disadvantageous result.

An efficient and reliable allocating procedure gives results which require less modification due to ignored information. Such an allocation procedure may be efficient, i.e., it generally achieves the result faster, and is reliable, i.e., it may achieve advantageous results.

SUMMARY OF THE INVENTION

Embodiments of the present invention may provide an efficient and reliable allocating procedure which determines the material flow of a product by taking relevant kinds of information into account and computing a result which allows for the relevant kinds of information.

Embodiments of the present invention may provide for a computer-implemented method for determining material flows of a product in a production environment, the method including: accessing requirement orders which describe demanded quantities of the product and receipt orders which describe planned available quantities of the product; classifying the requirement orders into priority classes which represent a priority of the requirement orders; classifying the receipt orders into feasibility classes which represent a likelihood of the receipt orders to be executable as planned; identifying a requirement order of the highest priority class which has a requirement order; identifying a receipt order of the highest feasibility class which has a receipt order; and creating a pegging linkage between the identified requirement order and the identified receipt order, wherein the pegging linkage represents a material flow of the product from an origin quantity represented by the identified receipt order to a destination quantity represented by the identified requirement order.

In further embodiments of the present invention, identifying a receipt order may involve selecting a receipt order of the highest feasibility class which has a receipt order using time selection criteria of at least one of a) the receipt order has a date which is within a specified range of the date of the identified requirement order; b) the receipt order has a date which is prior to the date of the identified requirement order and as close as possible to the date of the identified requirement order; and c) the receipt order has a date which is later than the date of the identified requirement order and as close as possible to the date of the identified requirement order. In further embodiments of the present invention, the receipt order which meets selection criteria a) prevails over the receipt order which meets selection criteria b) or c), and the receipt order which meets selection criteria b) prevails over the receipt order which meets selection criteria c).

In further embodiments of the present invention, the herein-described computer-implemented method for determining material flows of a product in a production environment, may further include: following accessing, copying data of the requirement orders and receipt orders into a data storage, wherein the data comprehend product, quantity, and date of the orders; following creating, reducing in the data storage object the quantities of the identified requirement order and the identified receipt order by the smaller of the quantities of the requirement order and the receipt order; deleting the data of the receipt order from the data storage object if the quantity of the receipt order reaches a threshold quantity; and repeating method steps of identifying the receipt order, creating the pegging linkage, reducing, and deleting until the reduced quantity of the requirement order reaches a further threshold quantity. In further embodiments, the copying may include copying the requirement orders into a first data storage object and copying the receipt orders into a second data storage object. In alternative embodiments, the copying may include copying into the first and the second data storage object with a table structure with columns at least for the priority and feasibility classes, the dates and the quantity of the orders, and the orders are stored as rows in the structures.

In further embodiments of the present invention, the computer-implemented method for determining material flows of a product in a production environment may include following classifying receipt orders, sorting the receipt orders in the data storage object by the feasibility class and by the date; selecting the receipt order in the data storage object by using a binary search algorithm with respect to the feasibility class and to the date.

In further embodiments of the present invention, the computer-implemented method for determining material flows of a product in a production environment may include following classifying requirement orders, sorting the requirement orders in the data storage object by the priority class and by the date; and repeating for the requirement orders of the data storage object from identifying a requirement order to repeating method steps. Identifying a requirement order may include identifying the requirement order sequentially according to the sorting.

In further embodiments of the present invention, the computer-implemented method for determining material flows of a product in a production environment may include following repeating for the requirement orders, checking created pegging linkages to comply with a condition, wherein the condition applies to pairs of pegging linkages with a first pegging linkage which connects a first requirement order of a priority class with a first receipt order of a feasibility class and with a second pegging linkage which connects a second requirement order of the priority class with a second receipt order of the feasibility class; the condition being that if a date of the first requirement order is prior to a date of the second requirement order, a date of first receipt order is prior to a date of the second receipt order; if the condition is not fulfilled for the first and the second pegging linkage; deleting the first and the second pegging linkage; and creating a pegging linkage between the first requirement order and the second receipt order and creating a further pegging linkage between the second requirement order and the first receipt order.

In further embodiments of the present invention, the computer-implemented method for determining material flows of a product in a production environment may include following identifying a requirement order, checking (310) that the requirement order date is prior to a specified date; otherwise, selecting a receipt order using time selection criteria of at least one of the receipt order has a date which is within a specified range of the date of the identified requirement order; b) the receipt order has a date which is prior to the date of the identified requirement order and as close as possible to the date of the identified requirement order; and c) the receipt order has a date which is later than the date of the identified requirement order and as close as possible to the date of the identified requirement order. In further embodiments, the receipt order which meets selection criteria a) prevails over the receipt order which meets selection criteria b) or c), and the receipt order which meets selection criteria b) prevails over the receipt order which meets selection criteria c).

In further embodiments of the present invention, the computer-implemented method for determining material flows of a product in a production environment may include following creating a step of processing the receipt order connected to the requirement order by a pegging linkage in such a way that the receipt order complies with a time criteria, wherein the time criteria specifies that the date of the receipt order is equal or prior to the date of the connected requirement order and if this is not possible it specifies that the date of the receipt order is as close as possible to the date of the connected requirement order.

Further embodiments of the present invention provide a computer program product having program instructions for causing a computer to perform the computer-implemented method for determining material flows of a product in a production environment as described herein.

Further embodiments of the present invention provide a computer system for performing the computer-implemented method for determining material flows of a product in a production environment as described herein.

Further embodiments of the present invention provide a computer readable medium for storing program instructions which cause a computer to perform the method for determining material flows of a product in a production environment as described herein.

Further embodiments of the present invention provide an automated transport system which transports materials according to a material flow determined by the method for determining material flows of a product in a production environment as described herein.

DETAILED DESCRIPTION

Figure 1:
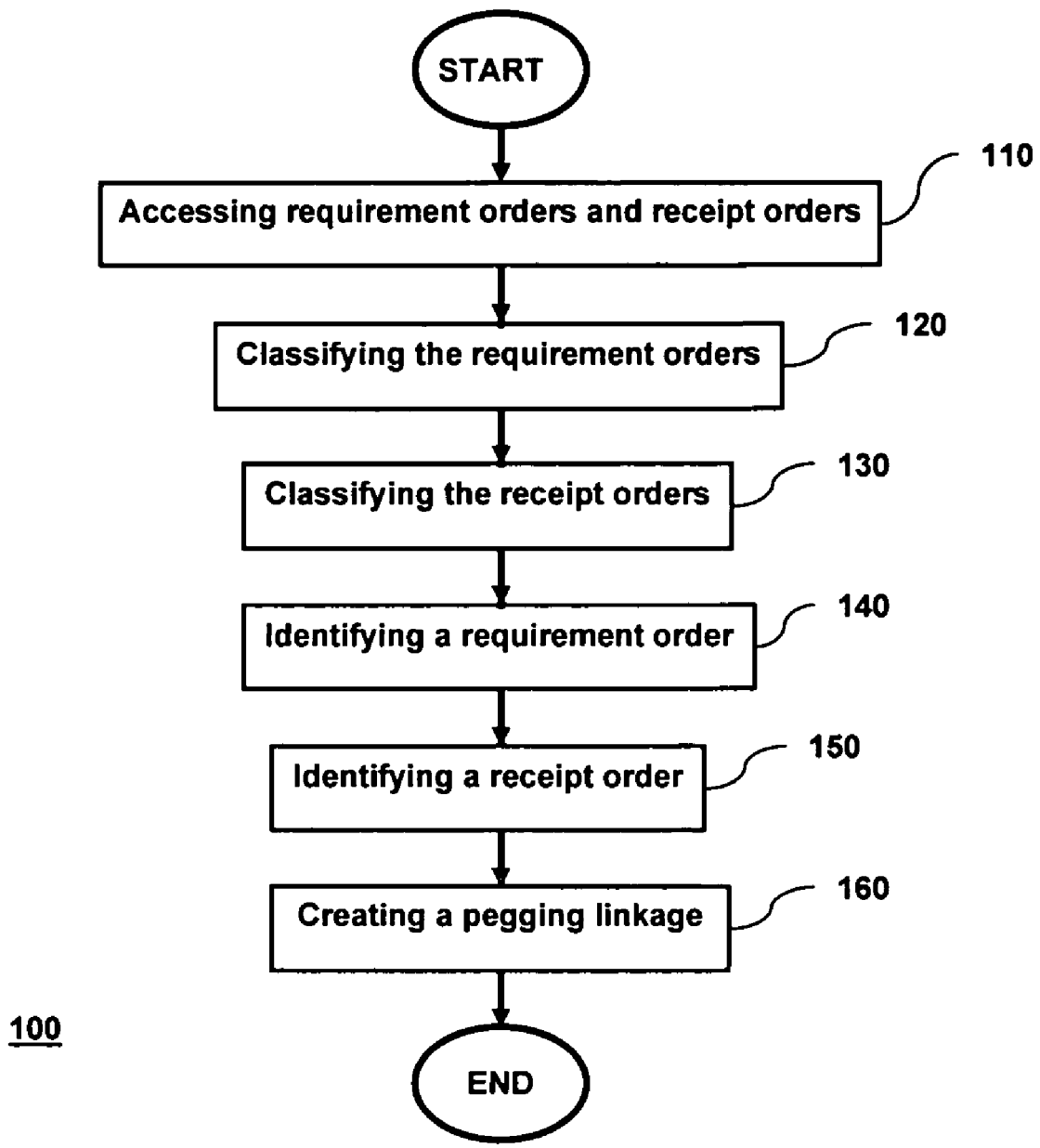
FIG. 1 shows a flow diagram of an embodiment of the present invention.

The following descriptions describe exemplary embodiments of the invention and do not limit the scope of the invention.

In general, production planning systems describe a concrete production situation which uses orders. A definition of an order may include a structure with different order items or order nodes. However, in the following, an order definition without a structure is used: an order is defined as a data set specifying at least a product, a quantity, a date, and a category. The date of an order specifies a point in time with a specified accuracy and the specified accuracy can vary, e.g., it may specify days, or it may specify hours, minutes, and seconds of the day. According to the order category, orders can be distinguished into requirement orders which represent a product demand and receipt orders which represent a product availability.

There are requirement orders and receipt orders for finished products which are sold to customers and for input products which go into the production of a finished product. In the present context, examples for requirement order categories include: sales orders and forecast orders for the finished products and dependent demand orders for the input products. Exemplary receipt orders include: planned orders, production orders, and stock orders for the finished products and the input products.

A determination of material flows by allocating available quantities can be done for finished products and for input products. A pegging linkage connects a receipt order with a requirement order. The pegging linkage specifies that a part of the available quantity represented by the receipt order is used to cover a part of the demanded quantity represented by the requirement order. In this way, the pegging linkage represents a material flow of a product within the production planning system. In the production environment, the material flow represented by the pegging linkage goes from an origin quantity represented by the receipt order to a destination quantity represented by the requirement order. The origin quantity and the destination quantity can be identified and located in the production environment.

An allocation procedure may be established to cover the requirement orders in time by receipt orders. In a production environment with restricted resources, it may not be possible to schedule feasible receipt orders in such a way that they cover the requirement orders in time. Feasible receipt orders are receipt orders for which the required production processes can be executed so that the order quantity is provided at the date of the receipt order.

In case of restricted resources additional information may be taken into account. The additional information may provide additional criteria for determining which requirement orders are covered by which receipt orders.

For the requirement orders there are priorities which can be assigned to the requirement orders. A priority of a requirement order reflects the priority with which the requirement order is to be covered by a receipt order. Some examples for different priorities are: a priority of a sales order is usually higher than a priority of a forecast order; this is due to the fact that a sales order serves a customer while a forecast order may be created only to, e.g., make use of production resources. Sales orders and forecast orders usually exist for finished products but it may be possible that similar priorities exist for requirement orders for input products: in this case, a requirement order which contributes to a sales order has a higher priority than a requirement order which contributes to a forecast order.

There are many further priorities which can be assigned to the requirement orders: it is possible that sales orders or forecast orders are assigned to, e.g., customers and there are customers of different priorities; the priorities of the customers may be used to assign the orders to corresponding priority classes, i.e., orders for customers of specific high priorities are assigned to a high priority class and orders for customers of specific low priorities are assigned to a low priority class. Other attributes of requirement orders can also be used to classify them into priority classes.

There are feasibility classes which can be used to classify the receipt orders: a date of a receipt order represents a point in time at which the order quantity is scheduled to be available; depending on the scheduling of the receipt order there may be a high likelihood that processes can be executed which are required for making the order quantity available or there may be a low likelihood that the processes can be executed. The likelihood of different types of receipt orders to be executable, i.e., to provide the order quantity according to a schedule can be used to classify the receipt orders.

Receipt orders may be classified into feasibility classes, e.g., according to order categories: an order of an order category used for stock orders may be assigned to a high feasibility class because the order quantities are physically in stock; stock orders may also have a date in the past so that they may be allocated for covering any requirement order in time. Production orders may represent a further order category and they can be assigned to a high feasibility class but not as high as a stock order. The reason for this is that a production order represents a quantity which is scheduled to be available in the future and the processes required to provide the order quantity are consolidated. The degree to which the production order relies on consolidated processes, i.e., it is consolidated, may be different. One example is that the resources and the input products required for the production order are available and are assigned to the production order. Furthermore, it may be that the production execution systems on shop floor level received already the schedules for executing the production order. Therefore, the feasibility of the production order is high but it can still happen that, e.g., a machine breaks down and scheduled processes cannot be executed.

Planned orders may be a further receipt order category which is used in the production planning system. They may be assigned to a low feasibility class because usually, they represent a quantity scheduled to be available in the future but without being consolidated. Often, it can happen that it has not been checked if the planned orders can be executed or not. Therefore, in a production environment with restricted resources, it cannot be expected that a planned order with a date which is prior to production order dates can be executed at the scheduled date. Such planned orders may have to be shifted further into the future to a time when the required resources will be available.

In a typical production environment, the number of requirement and receipt orders for one product may be large and/or the number of products may be large. The production environment may be complicated because there are frequent changes of the requirement and receipt orders for the products. There may be also a dependency between receipt orders for a first product and requirement orders for a second product because the second product goes into the production of the first product. The dependency can introduce changes of orders for the second product when orders for the first product are changed.

In such production environments, the number of material flows can be large and the determination of them may require a computation of a lot of data. It can be useful to determine the material flows within a production planning system and to use the results for controlling the material flows in the production environment. In order to do so, the data representing the material flows within the production planning system, i.e., data representing the pegging linkages, are transferred to an execution system. The execution system can use the transferred data to control the material flows on a shop floor level. This may include controlling an automated system for transporting materials from a first point of a production site to a second point of the production site.

Determining the material flows of the production in the production planning system may provide that additional information about the orders are available in the production planning system, which may lead to more reliable results. Furthermore, uncovered demanded quantities may be identifiable at an early stage so that the production planning can react to such a shortage of available products. In further embodiments, the determined material flows should be consistent with an order situation of the planning system. In case the determination of the material flows is done in a system different from the production planning system, the order data have to be stored and maintained in separate systems. Maintaining data in the separate systems may lead to inconsistent versions of the data when, e.g., changes of data in one system are not correctly transferred to another system. Furthermore, the separate systems require more combined memory space of servers which host the separate systems.

In figures, there are graphical representations and symbols used for describing exemplary production scenarios. Persons of ordinary skill in the art can implement methods of the invention without relying on the representations.

FIG. 1 displays a flow diagram with steps of a method 100 of the invention. A first method step 110 involves accessing requirement orders and receipt orders. The requirement and the receipt orders are for a product for which the allocating procedure is to be executed.

A next step 120 involves classifying the requirement orders into priority classes. As described above, a priority may be assigned to a requirement order based on information available for the order. The priorities can be classified into priority classes and priorities may treated according to the priority classes: members of the same class have the same priority, and members of a further class have a lower priority if the further class has a lower priority, and have a higher priority if the further class has a higher priority. There can be a well defined ranking of the priority classes from higher priority to lower priority. It is not mandatory that all classes have members.

A next step 130 involves classifying the receipt orders into feasibility classes. Analogous to the priorities, a feasibility value may be assigned to the receipt orders and to classify the feasibility values into feasibility classes. The feasibility values can be treated according to the feasibility classes: members of a higher feasibility classes are characterized as having a higher feasibility value, and members of lower feasibility classes are characterized as having a lower feasibility value. It is not mandatory that all feasibility classes have a member.

The following step 140 involves identifying a requirement order of the highest priority class which has a requirement order. That is, a requirement order of the highest priority class is identified and in case that the highest priority class does not have a requirement order a requirement order of the next highest priority class is identified. This procedure is repeated until a requirement order of a class can be identified. The following step 150 involves identifying a receipt order of the highest feasibility class which has a receipt order. That is, a receipt order of the highest feasibility class is identified and in case that the highest feasibility class does not have a receipt order, a receipt order of the next highest feasibility class is identified. This procedure is repeated until a receipt order of a class can be identified. A following step 160 involves creating a pegging linkage between the identified requirement and receipt order.

Figure 2:
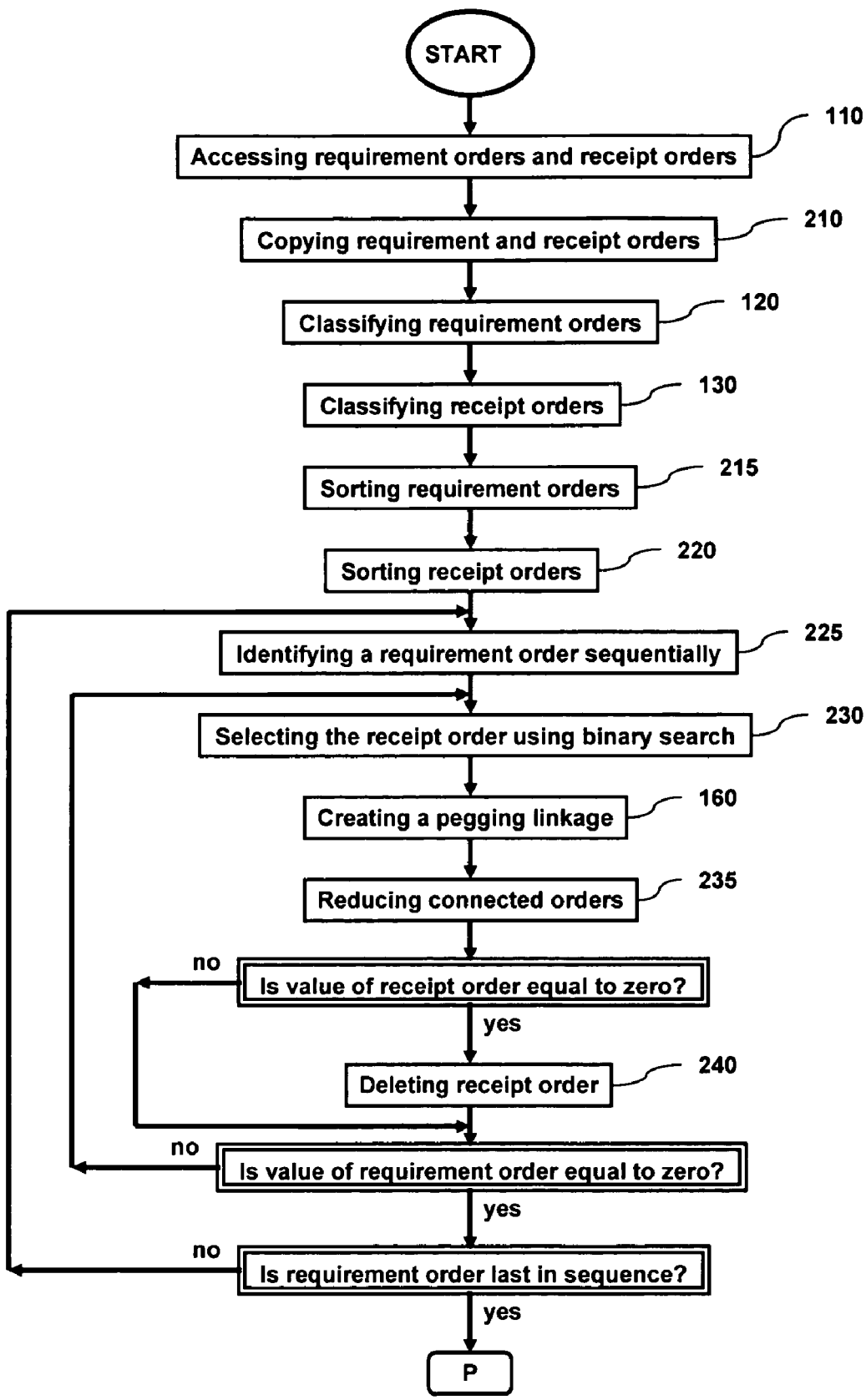
FIG. 2 shows a first part of a flow diagram displaying more steps of an embodiment of the present invention.
Figure 3:
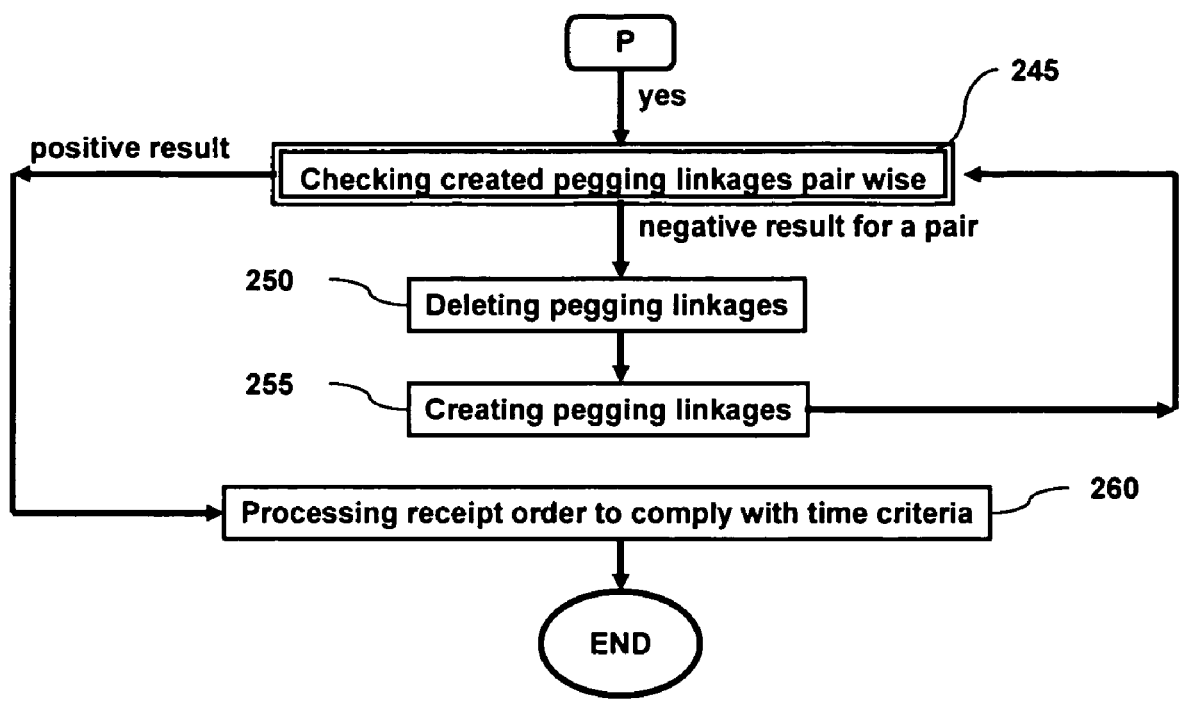
FIG. 3 shows a second part of a flow diagram displaying more steps of an embodiment of the present invention.

FIGS. 2 and 3 display method steps according to the method shown in FIG. 1, but including additional method steps. The steps in FIGS. 2 and 3 include: accessing 110 requirement orders and receipt orders; and copying 210 the requirement orders into a data storage object and the receipt orders into a further data storage object. The data storage object for the requirement orders may have a table structure with columns for the priority classes. The dates and the quantities of the orders and the further data storage object for the receipt orders may have a table structure with columns for the feasibility classes, the dates and the quantities of the orders. In both data storage objects, the orders may be stored as rows in the structure. The next steps can include classifying 120 the requirement orders and classifying 130 the receipt orders.

Additional steps may include: sorting 215 the requirement orders by the priority class and by the date in the data storage object, and sorting 220 the receipt orders by the feasibility class and by the date in the data storage object. As a result of the sorting, the requirement order of the highest priority class and with the earliest date is in the first row of the data storage object. In the next row, there is the requirement order of the highest priority class with the next earliest date. In case there is only one requirement order of the highest priority class, the requirement order with the earliest date of the next highest priority class with an order is in the second row. The sequence of the sorted requirement orders with respect to the rows can be described in the following way: a first order has a smaller row position number compared to a second order in case the priority class is higher than the priority class of the further order; in case the priority classes are identical, the first order has a smaller row position number if the date is prior to the date of the second order. The result of sorting the receipt orders is equivalent: a first order has a smaller row position number compared to a second order in case the feasibility class is higher than the feasibility class of the further order; in case the feasibility classes are identical, the first order has a smaller row position number if the date is prior to the date of the second order.

A following step 225 can involves identifying a requirement order sequentially according to the result of the sorting in the data storage object. A next step 230 can involve selecting the receipt order of the highest feasibility class occurring in the data storage object using a binary search algorithm with respect to the feasibility class and to the date. For the date, following selection criteria are used: (a) the receipt order of the highest feasibility class has a date that is within a specified range of the date of the identified requirement order, the order which meets this criteria prevails over orders which do not meet the criteria, (b) the receipt order of the highest feasibility class has a date which is prior to the date of the identified requirement order and as close as possible to the date of the identified requirement order, the order which meets this criteria prevails over orders which do not meet criteria (a) or (b), (c) the receipt order of the highest feasibility class has a date which is later than the date of the identified requirement order and as close as possible to the date of the identified requirement order. Due to sorting, the highest feasibility class occurring in the data storage object can be identified by determining the feasibility class of the order in the first row. The specified range of selection criteria (a) may depend on the format which is used for the date. For example, if the date of the requirement and the receipt order specifies year, day, hours, and seconds, it can be advantageous to define the range so that the receipt order meets criteria (a) if its date specifies the same year and day as the requirement order date. The binary search algorithm is applicable because the receipt orders are sorted by feasibility class and date. The binary search algorithm can be convenient because it uses the fact that the receipt orders are sorted to find the searched receipt order in an efficient way. In case there is no receipt order with a specified class and date, the binary search algorithm may be used to identify the row position number of the receipt order with the specified class and with a date which is the next later date compared to the specified date. The identified row position number is the row position number which a fictitious receipt order with the specified class and date would have in the data storage object. The identified row position number can be used to select receipt orders which meet criteria (a), (b), or (c), by determining the dates of the receipt order at the identified row position number and of the receipt order at the row position previous to the identified row position number.

A further step 160 involves creating a pegging linkage between the identified requirement order and the identified receipt order. A further step 235 involves reducing in the data storage object the quantities of the identified requirement order and the identified receipt order by the smaller of the quantities of the requirement order and the receipt order. A further step 240 involves deleting the receipt order from the data storage object if the quantity of the receipt order reaches a threshold quantity. One example of a possible value of the threshold quantity is zero. A further example of a value of the threshold quantity is a very small value which is close to zero. A further step involves repeating method steps of selecting 230 the receipt order, creating a pegging linkage 160, reducing 235 the quantities, and deleting 240 the receipt order until the reduced quantity of the requirement order reaches a further threshold quantity. Again, the value of the further threshold quantity may be zero or a small value close to zero. Following steps may include repeating for the requirement orders of the data storage object the steps from identifying 225 a requirement order to repeating method steps.

A next step 245 provides checking created pegging linkages that they comply with a condition. The condition applies to pairs of pegging linkages, a first pegging linkage which connects a first requirement order of a priority class with a first receipt order of a feasibility class and a second pegging linkage which connects a second requirement order of the priority class with a second receipt order of the feasibility. The condition is that if a date of the first requirement order is prior to a date of the second requirement order, a date of first receipt order is prior to a date of the second receipt order. In case the criteria is not fulfilled for two pegging linkages, additional steps may include deleting 250 the first and the second pegging linkage and creating 255 a pegging linkage between the first requirement order and the second receipt order and creating a further pegging linkage between the second requirement order and the first receipt order. The created pegging linkage and further pegging linkage comply with the condition. The steps of deleting 250 and creating 255 are executed for the two pegging linkages that do not comply with the condition until the pairs of the created pegging linkages comply with the condition. After checking 245 the created pegging linkages with a positive result the step of processing 260 the receipt order connected to the requirement order by a pegging linkage in such a way that the receipt order complies with a time criteria, wherein the time criteria specifies that the date of the receipt order is equal or prior to the date of the connected requirement order and if this is not possible it specifies that the date of the receipt order is as close as possible to the date of the connected requirement order. The processing 260 can be done by a separate component which has access to data required changing the dates of the receipt orders. One example for the separate component is the Optimizer of the Supply Chain Management program commercially available from SAP AG, Walldorf, Germany.

Figure 4:
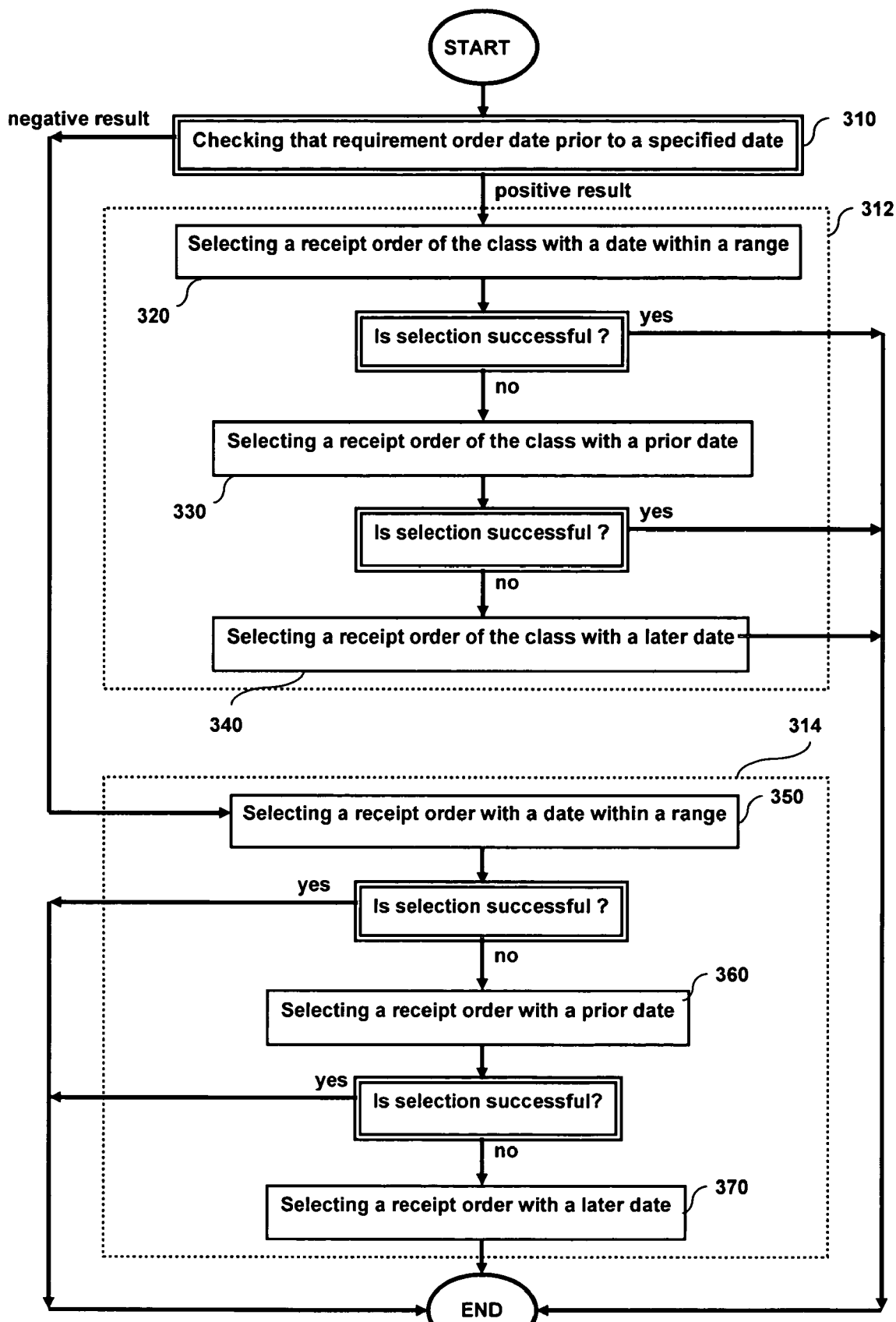
FIG. 4 shows a flow diagram displaying an embodiment of selecting a receipt order.

FIG. 4 is a flow diagram displaying an embodiment of method steps to select a receipt order. It illustrates the step of checking 310 that the requirement order date is prior to a specified date. It further illustrates embodiments of the step selecting 312 the receipt order of the highest feasibility class using time selection criteria and the step selecting 314 the receipt order using time selection criteria. If there is a positive checking result, selecting 312 is done by selecting 320 the receipt order using time selection criteria (a), i.e., the receipt order has a date which is within the specified range of the date of the identified requirement order. If the selection is successful selecting 312 is terminated, then selecting 330 is executed according to time selection criteria (b), i.e., the receipt order has a date which is prior to the date of the identified requirement order and as close as possible to the date of the identified requirement order. If the selection is successful selecting 312 is terminated, then selecting 340 is executed according to time selection criteria (c), i.e., the receipt order has a date which is later than the date of the identified requirement order and as close as possible to the date of the identified requirement order. If the result of checking 310 is negative, selecting 314 the receipt order is done by selecting 350 a receipt order using time selection criteria (a), i.e., the receipt order has a date that is within a specified range of the date of the identified requirement order. If the selection is successful, selecting 314 is terminated, selecting 360 is executed according to time selection criteria (b), i.e., the receipt order has a date which is prior to the date of the identified requirement order and as close as possible to the date of the identified requirement order. If the selection is successful selecting 314 is terminated, selecting 370 is executed according to time selection criteria (c), i.e., the receipt order has a date which is later than the date of the identified requirement order and as close as possible to the date of the identified requirement order. The specified date which is used in checking 310 may represent, e.g., an external procurement date. Requirement orders which are farther in the future than the external procurement date can be covered by receipt orders that are procured externally as an alternative way. For this reason, the feasibility class of receipt orders that cover the externally coverable requirement orders is not relevant. This is so because, e.g., if the externally coverable requirement order is covered by the low feasibility receipt order and the receipt order proves later to be not executable, it is possible to use the alternative and cover the requirement order externally. The external procurement date may change, e.g., depending on the date when the method of the invention is executed.

Figure 5:
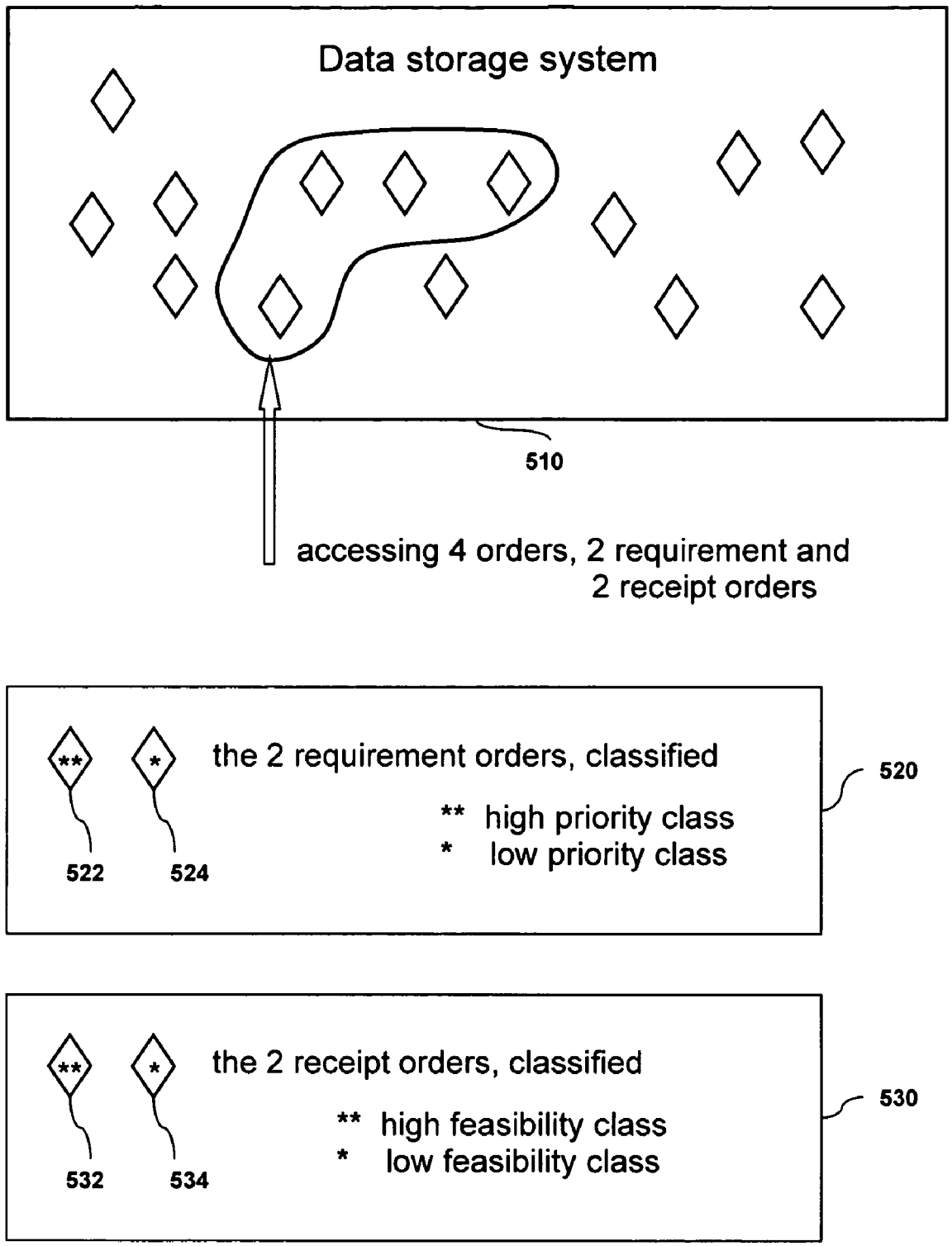
FIG. 5 shows exemplary embodiments of orders which are accessed and classified.

FIG. 5 illustrates exemplary embodiments of orders which are accessed and classified. It displays a data storage system 510 for orders. The data storage system may be, e.g., a LiveCache storage system which is used in the Supply Chain Management product of SAP AG for storing order data. Accessing 110 orders for a product leads in the example to accessing 4 orders, 2 of which are requirement orders and 2 of which are receipt orders for the product. Classifying 120 the requirement orders leads to result 520: one order 522 is assigned to a high priority class and the other order 524 to a low priority class. Classifying 130 the receipt orders leads to result 530: one order 532 is assigned to a high feasibility class and the other order 534 to a low feasibility class.

Figure 6:
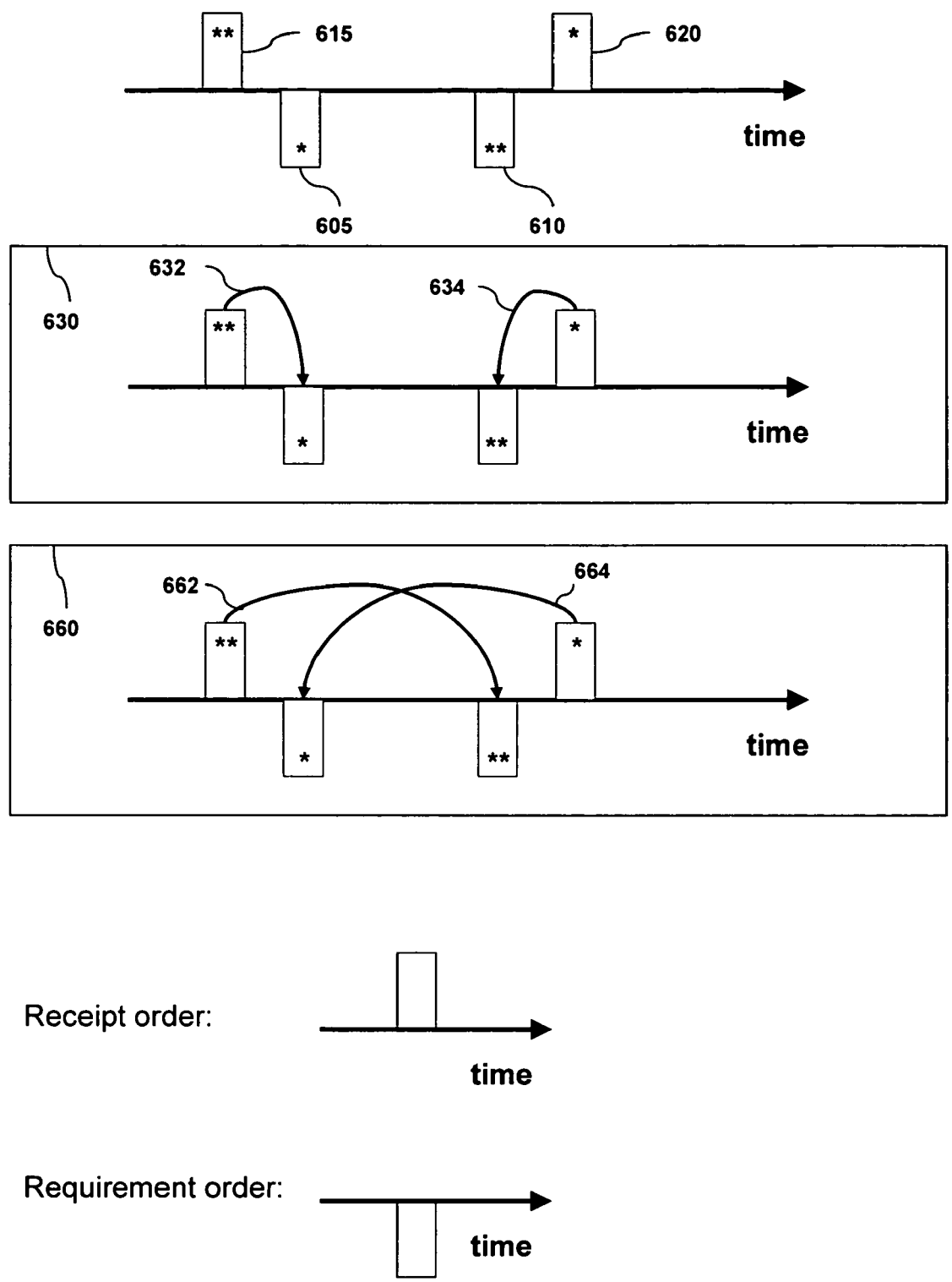
FIG. 6 shows an exemplary order situation and results obtained from different allocating procedures.

In FIG. 6, a specific order situation is displayed together with a result 630 of a time based pegging procedure as well as a result 660 of the method of the invention. The specific order situation consists of 2 requirement orders 605 and 610, one 605 is assigned to a low priority class (*) and one 610 is assigned to a high priority class (**). Furthermore, there are 2 receipt orders 615 and 620, one 620 is assigned to a low feasibility class (*) and one 615 is assigned to a high feasibility class (**). The orders are positioned on the time bar according to their dates, i.e., an order with a date far in the future is on the right side of the time bar and the order with a date in the near future is more to the left side of the time bar. The time for executing the method is not indicated on the time bar since it is not relevant at the moment, and it may also be that the order has a date in the past. It is convenient to indicate requirement orders using negative values for the quantity and this is the reason why the requirement orders are displayed by blocks beneath the time bar. The height of the blocks indicates the quantity of the orders and in the figure the orders have substantially equal quantities. In the results, the order situation is equal to the specific order situation, i.e., the allocating procedures do not modify the orders.

Box 630 displays the result of a conventional time based allocating procedure that takes the dates of the orders into account. The conventional procedure covers the earlier requirement orders with the earlier receipt orders. In the figure, the procurement time is not displayed because it is farer in the future than the displayed time bar. The result of the conventional procedure is pegging linkages 632 and 634 indicating which requirement order is covered by which receipt order. According to the conventional procedure, the prior low priority order is covered by the prior high feasibility order and the high priority order farer in the future is covered by the low feasibility order farer in the future.

Box 660 displays the result according the allocating procedure of the method. The orders are prior to the procurement time and the method covers higher priority orders with higher feasibility orders. Accordingly, the result is that there is the pegging linkage 662 between the high feasibility order and the high priority order and there is the pegging linkage 664 between the low feasibility order and the low priority order. The result is useful in the example because there is a high probability that the high priority order is covered in time and this is more important than covering the low priority order. The low priority order is not as important and it may be modified so that it is timed further into the future and is covered in time by the low priority receipt.

Figure 7:
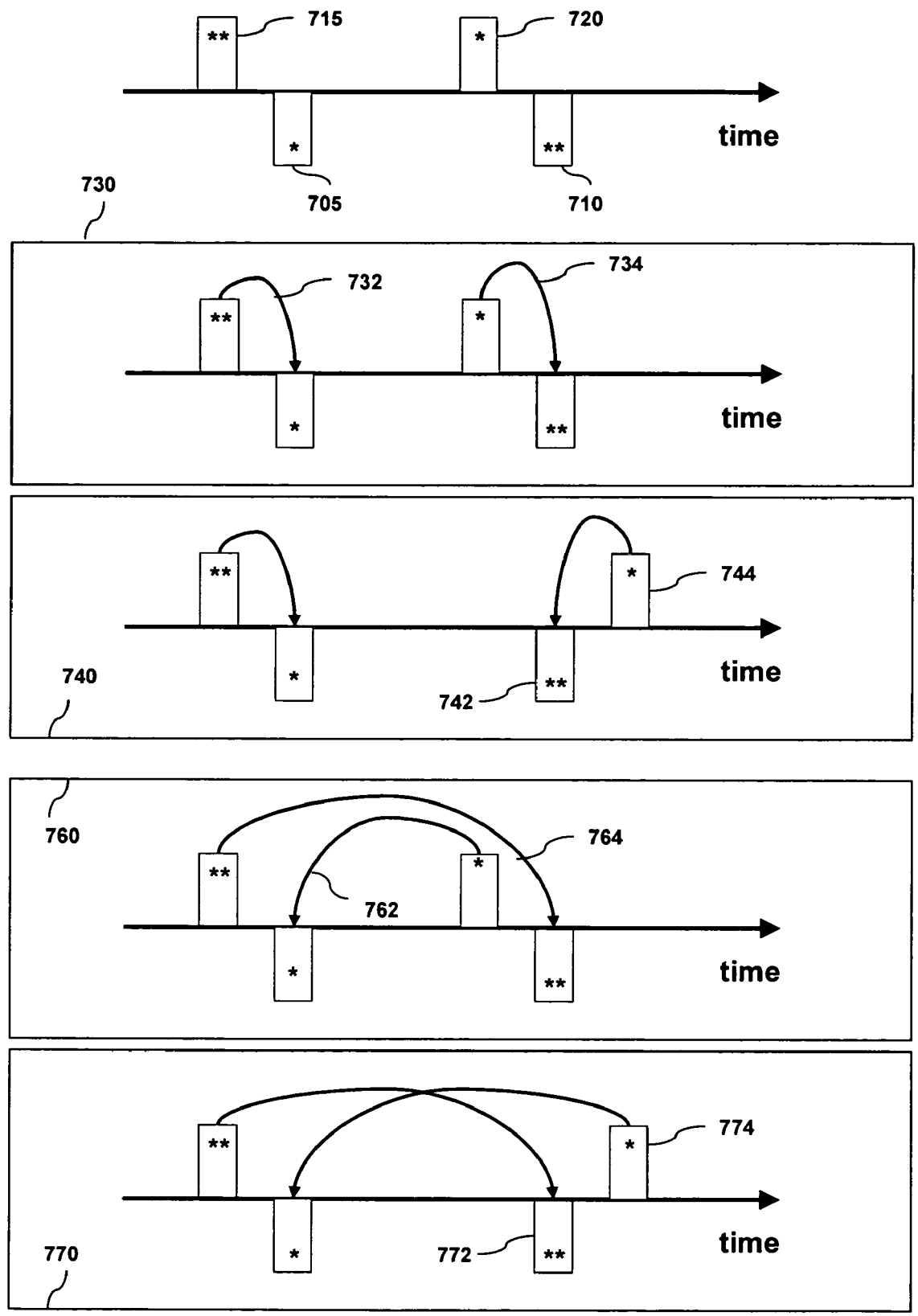
FIG. 7 shows a further exemplary order situation and results obtained from different allocating procedures, wherein the results are displayed prior to and after a calculation of the order situation.

In FIG. 7, there is an order situation consisting of 4 orders and the result 730 and 740 of the conventional time based allocating procedure and the result 760 and 770 of the allocating procedure of the method. High feasibility order 715 is prior to low feasibility receipt order 720 and prior to low priority requirement order 705. Low feasibility order 720 is prior to high priority order 710.

The result of the procedure in box 730 is the pegging linkage 732 and 734. The result is the coverage of the 2 requirement orders in time. In box 740 there is the same result as in box 730 after a further calculation of the order situation. As a result of the further calculation, the date of the low feasibility order 744 is changed to be farer in the future and the high priority order 742 is not covered in time. Such changes of the dates may happen frequently for low feasibility orders because there is, e.g., a shortage of available resources required to fulfil the low feasibility order. In contrast to this, high feasibility orders may be changed less frequently due to their high feasibility status.

The result of the allocating procedure of the method is displayed in box 760. The procurement time is farther in the future than the displayed cut-out of the time bar. Therefore, the result is the pegging linkage 762 between the low priority order and the low feasibility order, and the pegging linkage 764 between the high priority order and the high feasibility order. The low priority requirement order is not covered in time but the high priority order is. After the further calculation of the order situation, receipt order 774 is farther in the future but high priority order 772 is still covered by the high feasibility receipt.

Figure 8:
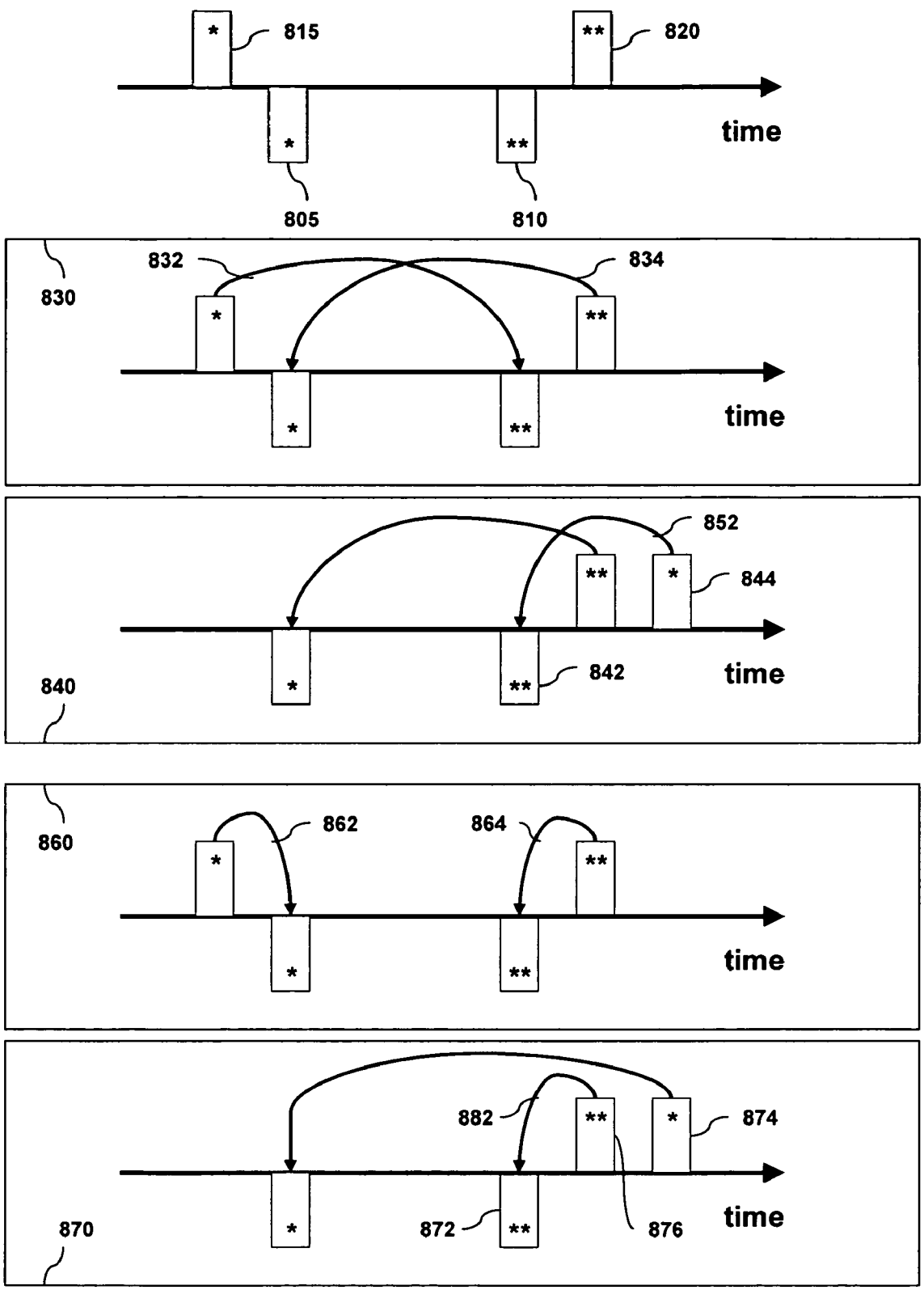
FIG. 8 shows a further exemplary order situation and results obtained from different allocating procedures, wherein the results are displayed prior to and after a calculation of the order situation.

In FIG. 8, there is a further order situation with results from 2 different allocating procedures. The order situation consists of the low priority requirement order 805, the high priority requirement order 810, the low feasibility receipt order 815 and the high feasibility receipt order 820. In box 830, there is the result of a priority based allocating procedure. The priority based allocating procedure takes into account the dates and the priorities of the requirement orders. The result is that higher priority orders are covered first in time prior to covering lower priority orders. The feasibility of the receipt orders is not taken into account. The result in box 830 is the pegging linkage 832 between the low feasibility order and the high priority order and the pegging linkage 834 between the low priority order and the high feasibility order. The high priority requirement is covered in time but this is changed after calculating the order situation. The result of the further calculation is displayed in box 840. The low feasibility order 844 is timed far in the future and according to the pegging linkage 852 the high priority order 842 is not covered in time.

Such a change of the date of the low feasibility receipt order may be due to facts that can occur frequently: high feasibility receipts are created as late as possible in the production system, i.e., they lie in the near future. This is because they are usually difficult to reschedule and therefore reduce the flexibility for following calculations of the order situation. Furthermore, high feasibility receipts are scheduled with a date that is as early as the availability of the required resources allows. This is because earlier high feasibility receipt orders cover potentially more requirement orders and because production processes in the near future have to be determined, e.g., by creating high feasibility orders, prior to the processes far in the future. Due to the facts, the low feasibility order with a date prior to the high feasibility order may be unlikely to be executable according to the scheduled time of the order. The low feasibility order may have to be rescheduled to a date farer in the future than the high feasibility order. Consequently, the displayed change of the low feasibility order 844 may occur frequently in production scenarios.

The result of the method is displayed in box 860: the pegging linkage 862 between the low priority requirement and the low feasibility order and the pegging linkage 864 between the high priority order and the high feasibility order. The high priority order is not covered in time. This is also the case after the further calculation of the order situation with the result displayed in box 870. However, the high feasibility order 876 covering the order 872 is prior to the changed low feasibility order 874. Therefore, the pegging linkage 882 can be advantageous in comparison with the pegging linkage 852.

Figure 9:
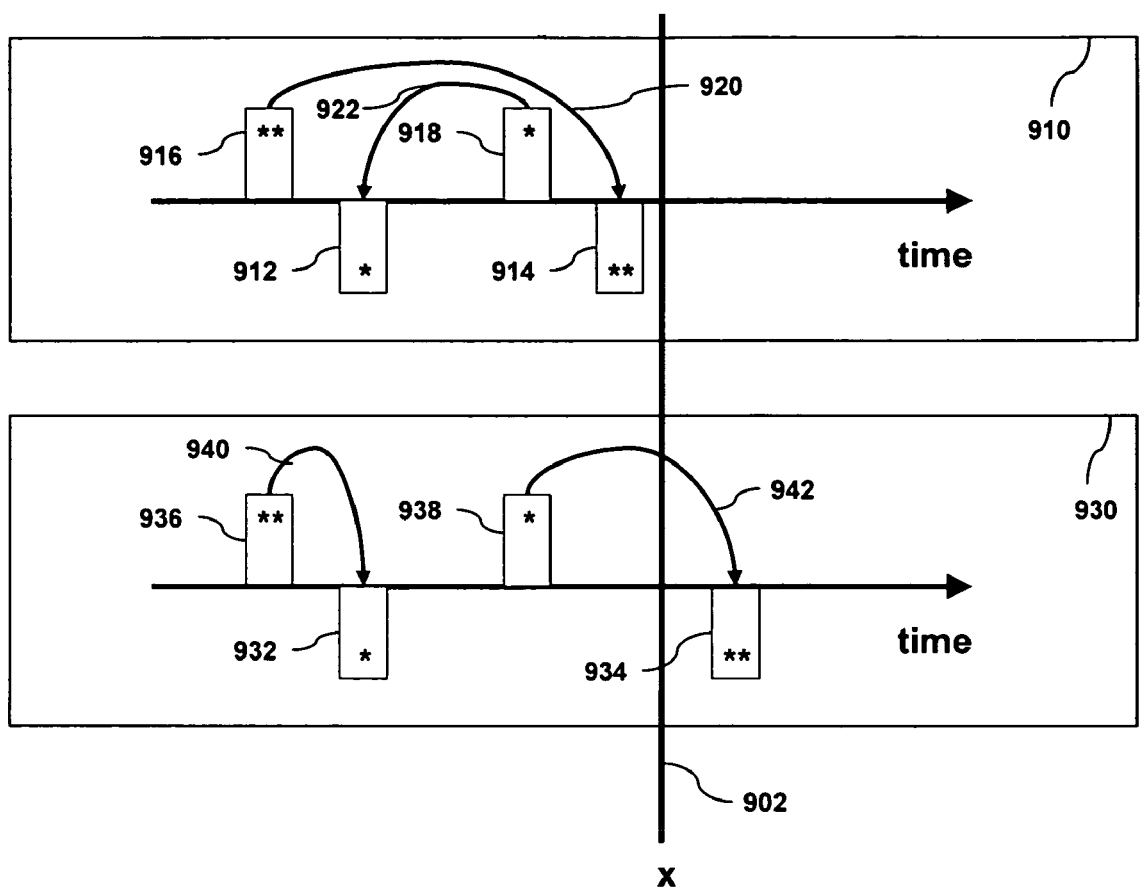
FIG. 9 shows a comparison of allocation results for different order situations with respect to a specified date used in an exemplary method.

FIG. 9 illustrates the results of the method for 2 different order situations with respect to the procurement date x. The cut out of the time bar is equal for the order situation displayed in 910 and for the order situation in 930. The procurement date is indicated by a line 902. In the first order situation, the 4 orders are prior to the procurement date and the result is the pegging linkage 920 between high priority order 914 and high feasibility order 916 and the pegging linkage 922 between the low priority order 912 and the low feasibility order 918.

In the order situation 930, the procurement date is prior to the high priority order 934. According to the method it is covered by the low feasibility order 938, indicated by pegging linkage 942. This is due to the fact that the method embodiment does not take into account the feasibility class of the receipt for covering the requirement order 934. The result is further the pegging linkage 940 between the low priority order 932 and the high feasibility order 936.

Figure 10:
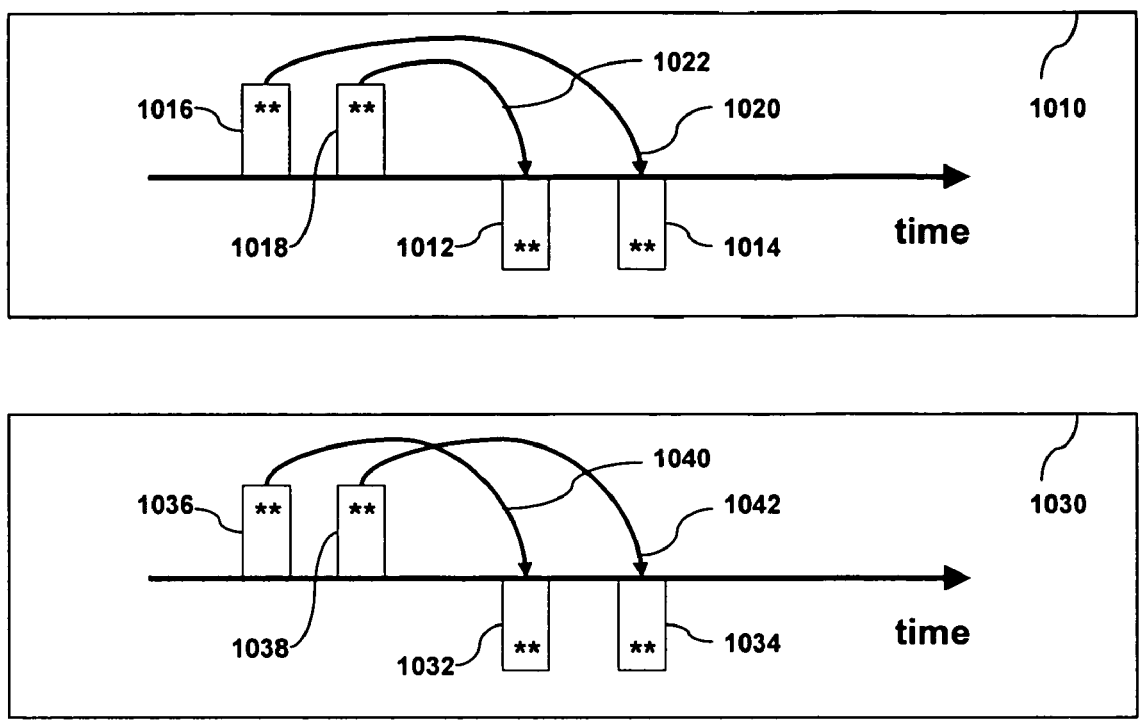
FIG. 10 shows a comparison of allocation results with and without using certain steps of an exemplary method.

FIG. 10 illustrates the same order situation with different pegging linkages before and after executing method steps. In box 1010, there is the pegging linkage 1020 between orders 1014 and 1016, and the pegging linkage 1022 between orders 1012 and 1018. The requirement orders are assigned the same high priority class and the receipt orders are assigned to the same high feasibility class. A relevant point with respect to the pegging linkages is that order 1012 which is prior to order 1014 is covered by order 1018 which is farer in the future than order 1016.

In box 1030 the allocating result is displayed after executing method steps checking 245 the created pegging linkages, deleting 250 the pegging linkages, and creating 255 the pegging linkages. The result is the pegging linkage 1040 between the orders 1032 and 1036 and the pegging linkage 1042 between the orders 1034 and 1038. The order 1032 which is prior to order 1034 is covered by order 1036 which is prior to order 1038. This is useful because it can be frequently desired that the date of the requirement order and the date of the covering receipt order is close. The result described in box 1010 may lead in a further calculation of the order situation to a result in which the sequence of the 2 receipt orders is changed. Such a change may imply many changes of other production processes and the changes render the production processes more unstable than changes due to retiming dates of receipt orders.

The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Computer readable mediums suitable for storing computer instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Automated transport systems for transporting materials can be programmable mobile robot systems able to move materials horizontally or vertically. Automated transport systems may also include loading robots, unloading robots, and band-conveyors.

What is claimed is:

1. A computer-implemented method for determining material flows of a product in a production environment, the method comprising:

accessing requirement orders describing demanded quantities of the product including a date when the product is demanded and receipt orders describing planned available quantities of the product including a date when the quantities are available;

classifying the requirement orders into priority classes which represent a priority of the requirement orders;

classifying the receipt orders into feasibility classes which represent a likelihood of the receipt orders to be executable as planned;

identifying a requirement order from a highest priority non-empty class, the highest priority non-empty class having the a higher priority than any other feasibility class with at least one requirement order;

identifying a receipt order from a highest feasibility non-empty class, the highest feasibility non-empty class having a higher feasibility than any other feasibility class with at least one receipt order, and wherein identifying a receipt order further comprises using time selection criteria of at least one of a) the date of the receipt order is within a specified range of the date of the identified requirement order; b) the date of the receipt order is prior to the date of the identified requirement order and as close as possible to the date of the identified requirement order; and c) the date of the receipt order has a date which is later than the date of the identified requirement order and as close as possible to the date of the identified requirement order; and creating a pegging linkage between the identified requirement order and the identified receipt order, wherein the pegging linkage represents a material flow of the product from an origin quantity represented by the identified receipt order to a destination quantity represented by the identified requirement order.

2. The method of claim 1 wherein a receipt order which meets selection criteria a) prevails over the a receipt order which meets selection criteria b) or c), and a receipt order which meets selection criteria b) prevails over a receipt order which meets selection criteria c).

3. A computer implemented method for determining material flows of a product in a production environment, comprising:

accessing requirement orders describing demanded quantities of the product including a date when the product is demanded and receipt orders describing planned available quantities of the product including a date when the quantities are available;

copying data of the requirement orders and receipt orders into a data storage object, wherein the data comprises product, quantity, and date of the orders;

classifying the requirement orders into priority classes which represent a priority of the requirement orders;

classifying the receipt orders into feasibility classes which represent a likelihood of the receipt orders to be executable as planned;

identifying a requirement order from a highest priority non-empty class, the highest priority non-empty class having a higher priority than any other feasibility class with at least one requirement order;

identifying a receipt order from a highest feasibility non-empty class, the highest feasibility non-empty class having a higher feasibility than any other feasibility class with at least one receipt order;

creating a pegging linkage between the identified requirement order and the identified receipt order, wherein the pegging linkage represents a material flow of the product from an origin quantity represented by the identified receipt order to a destination quantity represented by the identified requirement order;

reducing in the data storage object the quantities of the identified requirement order and the identified receipt order by the smaller of the quantities of the requirement order and the receipt order;

deleting the data of the receipt order from the data storage object if the quantity of the receipt order reaches a threshold quantity; and repeating method steps of identifying a receipt order, creating a pegging linkage, reducing, and deleting until the quantities of the identified requirement order reaches a further threshold quantity.

4. A computer readable medium for storing program instructions which cause a computer to perform a method for determining material flows of a product in a production environment, the method comprising:

accessing requirement orders describing demanded quantities of the product including a date when the product is demanded and receipt orders describing planned available quantities of the product including a date when the quantities are available;

copying data of the requirement orders and receipt orders into a data storage object, wherein the data comprises product, quantity, and date of the orders;

classifying the requirement orders into priority classes which represent a priority of the requirement orders;

classifying the receipt orders into feasibility classes which represent a likelihood of the receipt orders to be executable as planned;

identifying a requirement order from a highest priority non-empty class, the highest priority non-empty class having a higher priority than any other feasibility class with at least one requirement order;

identifying a receipt order from a highest feasibility non-empty class, the highest feasibility non-empty class having a higher feasibility than any other feasibility class with at least one receipt order;

creating a pegging linkage between the identified requirement order and the identified receipt order, wherein the pegging linkage represents a material flow of the product from an origin quantity represented by the identified receipt order to a destination quantity represented by the identified requirement order;

reducing in the data storage object the quantities of the identified requirement order and the identified receipt order by the smaller of the quantities of the requirement order and the receipt order;

deleting the data of the receipt order from the data storage object if the quantity of the receipt order reaches a threshold quantity; and repeating method steps of identifying a receipt order, creating a pegging linkage, reducing, and deleting until the quantities of the identified requirement order reaches a further threshold quantity.

5. An automated transport computer system implemented using a computer which transports materials according to a material flow determined by a method comprising:

accessing requirement orders describing demanded quantities of the product including a date when the product is demanded and receipt orders describing planned available quantities of the product including a date when the quantities are available;

copying data of the requirement orders and receipt orders into a data storage object, wherein the data comprises product, quantity, and date of the orders;

classifying the requirement orders into priority classes which represent a priority of the requirement orders;

classifying the receipt orders into feasibility classes which represent a likelihood of the receipt orders to be executable as planned;

identifying a requirement order from a highest priority non-empty class, the highest priority non-empty class having a higher priority than any other feasibility class with at least one requirement order;

identifying a receipt order from a highest feasibility non-empty class, the highest feasibility non-empty class having a higher feasibility than any other feasibility class with at least one receipt order;

creating a pegging linkage between the identified requirement order and the identified receipt order, wherein the pegging linkage represents a material flow of the product from an origin quantity represented by the identified receipt order to a destination quantity represented by the identified requirement order;

reducing in the data storage object the quantities of the identified requirement order and the identified receipt order by the smaller of the quantities of the requirement order and the receipt order;

deleting the data of the receipt order from the data storage object if the quantity of the receipt order reaches a threshold quantity; and repeating method steps of identifying a receipt order, creating a pegging linkage, reducing, and deleting until the quantities of the identified requirement order reaches a further threshold quantity and transporting materials.

6. A computer-implemented method for determining material flows of a product in a production environment, the method comprising:

accessing requirement orders describing demanded quantities of the product and receipt orders describing planned available quantities of the product;

copying data of the requirement orders and receipt orders into a data storage object, wherein the data comprises product, quantity, and date of the orders;

classifying the requirement orders into priority classes which represent a priority of the requirement orders;

classifying the receipt orders into feasibility classes which represent a likelihood of the receipt orders to be executable as planned;

identifying a requirement order from a highest priority non-empty class, the highest priority non-empty class having a higher priority than any other feasibility class with at least one requirement order;

identifying a receipt order from a highest feasibility non-empty class, the highest feasibility non-empty class having a higher feasibility than any other feasibility class with at least one receipt order;
creating a pegging linkage between the identified requirement order and the identified receipt order,
wherein the pegging linkage represents a material flow of the product from an origin quantity represented by the identified receipt order to a destination quantity represented by the identified requirement order;
reducing in the data storage object the quantities of the identified requirement order and the identified receipt order by the smaller of the quantities of the requirement order and the receipt order;
deleting the data of the receipt order from the data storage object if the quantity of the receipt order reaches a threshold quantity; and
repeating method steps of identifying a receipt order, creating a pegging linkage, reducing, and deleting until the quantities of the identified requirement order reaches a further threshold quantity.

7. The method of claim 6 wherein copying comprises copying the requirement orders into a first data storage object and copying the receipt orders into a second data storage object.

8. The method of claim 7 wherein copying comprises copying into the first and the second data storage object with a table structure with columns at least for the priority and feasibility classes, the dates and the quantity of the orders, and the orders are stored as rows in the structures.

9. The method of claim 7 further comprising:
following classifying receipt orders, sorting the receipt orders in the data storage object for each of the feasibility classes and by the date; and
selecting the a receipt order in the data storage object by using a binary search algorithm with respect to the feasibility class and to the date.

10. The method of claim 7 further comprising:
following classifying requirement orders, sorting the requirement orders in the data storage object for each of the priority classes and by the date; and
repeating for each of the requirement orders of the data storage object the method steps from the step of identifying a requirement order to the step of repeating method steps of identifying a receipt order,
wherein identifying a requirement order includes identifying the requirement order sequentially according to the sorting.

11. The method of claim 10 further comprising:
following repeating for each of the requirement orders, checking created pegging linkages to comply with a condition, wherein the condition applies to pairs of pegging linkages with a first pegging linkage which connects a first requirement order of a priority class with a first receipt order of a feasibility class and with a second pegging linkage which connects a second requirement order of the priority class with a second receipt order of the feasibility class;
the condition being that if the date of the first requirement order is prior to the date of the second requirement order, the date of the first receipt order is prior to the date of the second receipt order; if the condition is not fulfilled for the first and the second pegging linkage then;
deleting the first and the second pegging linkage; and
creating a pegging linkage between the first requirement order and the second receipt order and creating a further pegging linkage between the second requirement order and the first receipt order.

12. A computer-implemented method for determining material flows of a product in a production environment, the method comprising:
accessing requirement orders describing demanded quantities of the product including a date when the product is demanded and receipt orders describing planned available quantities of the product including a date when the quantities are available;
classifying the requirement orders into priority classes which represent a priority of the requirement orders;
classifying the receipt orders into feasibility classes which represent a likelihood of the receipt orders to be executable as planned;
identifying a requirement order from a highest priority non-empty class, the highest priority non-empty class having a higher priority than any other feasibility class with at least one requirement order;
when the date of the identified requirement order is prior to a specified date,
then, identifying a receipt order from a highest feasibility non-empty class, the highest feasibility non-empty class having a higher feasibility than any other feasibility class with at least one receipt order;
otherwise, selecting a receipt order using time selection criteria of at least one of a) the date of the receipt order is within a specified range of the date of the identified requirement order; b) the date of the receipt order is prior to the date of the identified requirement order and as close as possible to the date of the identified requirement order; and c) the date of the receipt order has a date which is later than the date of the identified requirement order and as close as possible to the date of the identified requirement order; and
creating a pegging linkage between the identified requirement order and the identified receipt order,
wherein the pegging linkage represents a material flow of the product from an origin quantity represented by the identified receipt order to a destination quantity represented by the identified requirement order.

13. The method of claim 12, wherein a receipt order which meets selection criteria a) prevails over a receipt order which meets selection criteria b) or c), and a receipt order which meets selection criteria b) prevails over the a receipt order which meets selection criteria c).

14. A computer-implemented method for determining material flows of a product in a production environment, the method comprising:
accessing requirement orders describing demanded quantities of the product including a date when the product is demanded and receipt orders describing planned available quantities of the product including a date when the quantities are available;
classifying the requirement orders into priority classes which represent a priority of the requirement orders;
classifying the receipt orders into feasibility classes which represent a likelihood of the receipt orders to be executable as planned;
identifying a requirement order from a highest priority non-empty class, the highest priority non-empty class having a higher priority than any other feasibility class with at least one requirement order;
identifying a receipt order from a highest feasibility non-empty class, the highest feasibility non-empty class having a higher feasibility than any other feasibility class with at least one receipt order, and wherein identifying a receipt order further comprises using time selection criteria such that the date of the receipt order is equal or prior to the date of the connected requirement order and if this is not possible it specifies that the date of the receipt order is as close as possible to the date of the connected requirement order; and creating a pegging linkage between the identified requirement order and the identified receipt order, wherein the pegging linkage represents a material flow of the product from an origin quantity represented by the identified receipt order to a destination quantity represented by the identified requirement order.

* * * * *